Уnited States Patent Office 2,782,210
Patented Feb. 19, 1957

2,782,210

NEW OXIDATION PRODUCTS OF ORGANIC COMPOUNDS, AND A METHOD OF MAKING SAME

Hans Joachim Teuber, Heidelberg, Germany

No Drawing. Application June 20, 1952,
Serial No. 294,713

Claims priority, application Germany July 24, 1951

9 Claims. (Cl. 260—396)

This invention relates to new oxidation products of organic compounds, and more particularly to new quinone compounds, and an improved oxidation and dehydrogenation method of preparing such new quinone and other compounds.

It is one object of this invention to provide a very effective dehydrogenation and oxidation method which is especially suitable for preparing quinone compounds.

Another object of this invention consists in providing a method of converting monovalent phenols into quinones whereby, in the course of reaction, the hydroxyl group is oxidized and a further oxygen atom is introduced into the molecule, thereby producing quinones.

Still another object of this invention consists in providing an oxidation and dehydrogenation method which proceeds under very mild conditions and, therefore, is applicable to organic compounds of complicated structure and of high sensitivity to chemical agents, such as natural products, hormones, vitamins, alkaloids and others.

A further object of this invention is to provide a method of oxidizing phenols having a carboxyl group in p-position. Such phenols form p-quinones whereby the carboxyl group is split off.

Still a further object of this invention is to provide a method of preparing the oxidizing and dehydrogenating agent, the alkali salts of nitroso disulfonic acid, in a stable solid form which allows storage for several months.

Still another object of this invention consists in dehydrogenating and oxidizing hydrazine compounds, especially phenyl hydrazine.

Further objects of this invention will become evident from the specification and the examples given therein.

According to this invention oxidizable organic compounds are subjected to the action of the alkali salts of nitroso disulfonic acid, especially to the action of the potassium salt of nitroso disulfonic acid of the following formula

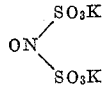

Said compound, as a tetravalent nitrogen compound, has the tendency to be readily converted into the corresponding hydroxylamine compound according to the following formula, thereby adding one hydrogen atom and losing its radical character:

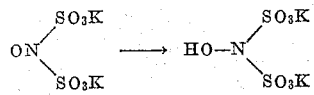

To produce this salt in a stable form so that it can be stored, without decomposition, for several months, requires the use of pure chemical reagents. Furthermore, when dehydrogenating the sodium salt of hydroxylamine disulfonic acid, obtained from sodium nitrite and 10 N sodium hydrogen sulfite solution, with potassium permanganate in the presence of ammonia, it is essential to use an excess of ammonia and to strongly cool the solution. One of the most important steps in producing a stable product consists in carefully filtering off the manganese dioxide sludge. Preferably the manganese dioxide precipitate is allowed to settle before filtration. Furthermore, filtration through the same filter the pores of which are filled by manganese oxide, is to be repeated until the violet filtrate is absolutely free of manganese. The potassium salt of nitroso disulfonic acid is precipitated from the solution of its sodium salt by the addition of the same volume or of one and a half times its volume of a potassium chloride solution saturated at 20° C. The mixture is then strongly cooled, preferably in ice. After filtration, the potassium salt is recrystallized from potassium hydroxide solution. The recrystallized and filtered salt is washed with alcohol to remove adhering alkali hydroxide. Care must be taken that the alcohol does not contain any reducing impurities; preferably pure methanol is used for this purpose. The solid salt is stored in a vacuum desiccator.

The salt is of neutral reaction. Its solution in water remains clear on addition of barium hydroxide water while barium chloride solution causes precipitation. Decomposed preparations are of acid reaction and barium sulfate is precipitated therefrom by the addition of barium hydroxide solution. The salt is soluble in about 50 parts of water and, at 50° C., in about 20 parts of N potassium hydroxide solution. Iodine is precipitated from neutral or, more completely, from acidified iodide solution in an amount approximately corresponding to an oxidation equivalent.

The potassium salt and also other metal salts of nitroso disulfonic acid are excellent dehydrogenating and oxidizing agents for the dehydrogenation and oxidation of organic compounds and especially of aromatic hydroxy compounds, i. e. of phenols and their substitution products. The phenols are converted thereby into the corresponding quinones whereby the phenolic hydroxy group is oxidized and a further oxygen atom is introduced into the molecule. In this manner it is possible to produce various quinones in a one-step process from the corresponding monovalent phenols. Phenol itself, for instance, yields p-quinone, o-cresol toluquinone, guaiacol methoxy quinone, thymol thymoquinone. Of course, when starting with hydroquinone, quinone is also obtained in a good yield. Other polyvalent phenols, such as pyrogallol, pyrocatechol, resorcinol, vanillin, α- and β-naphthol and others yield also quinone compounds.

Phenol carboxylic acids, such as p-hydroxy benzoic acid, yield also quinones whereby the carboxyl group is split off. Likewise, when oxidizing phenols the ortho- or para-positions respectively of which are occupied by other substituents, such as substituted or unsubstituted hydrocarbon residues, quinone-like compounds are obtained. Tyrosin, for instance, yields the corresponding o-quinone and tyrosine black. In tyrosine-containing substances, such as wool, silk, collagen and the like, the tyrosine component is converted first into the corresponding quinone and then into thyrosine black. This reaction, therefore, is suitable for detecting tyrosine in biological objects.

Ferula acid and similar acids containing a phenolic hydroxyl group, yield, on oxidation with potassium nitroso disulfonate, oxidation products, of which the one forms a monoxime with hydroxylamine.

Heterocyclic hydroxy compounds having a phenolic hydroxyl group in an aromatic component of said compound, such as 8-hydroxy quinoline, morphine, apomorphine, are also oxidized to quinone-like compounds.

Aureomycin and Terramycin yield oxidized compounds which have preserved their bacteriostatic activity.

The reaction is preferably carried out in aqueous solution since the alkali metal nitroso disulfonate is only soluble in water. The organic compound to be oxidized is either dissolved in water, methanol or is suspended therein. Water-insoluble acids and bases are employed in the form of their water-soluble salts. It is, however, also possible to dissolve the organic compound in ether and to shake its ethereal solution vigorously with the aqueous solution of the nitroso disulfonate. The pH-value of the reaction solution can be slightly acid, neutral or alkaline.

The oxidation is preferably carried out at a pH-value between 4.0 and 11.0. Said pH-value is maintained in the solution by the addition of buffer compounds of which following may be especially mentioned sodium acetate and mono sodium phosphate. Strong acid reaction has to be carefully avoided because the free nitroso disulfonic acid is a readily decomposable substance. Therefore, phosphate or sodium acetate buffer solutions are preferably added to the reaction mixture to assure said neutral or slightly acid or alkaline reaction. The new oxidizing agent is also used with great advantage in alkaline solution whereby the alkali hydroxide added should preferably not be more concentrated than a N alkali hydroxide solution. The violet color of the solution of the oxidizing agent is more or less rapidly decolorized by the reaction. Sometimes, however, the violet color of the solution changes to red or brown, even in cases where the reaction products are colorless. This phenomenon renders difficult observation of the end point of the oxidation. The reaction proceeds, in most cases, at room temperature so that heat need not be supplied.

The following examples serve to illustrate this invention without, however, limiting the same thereto.

*Example 1*

0.2 g. of phenol are dissolved in 5 cc. of water. 110 cc. of an aqueous solution containing 2.16 g. of the potassium salt of nitroso disulfonic acid are gradually added to said phenolic solution. The mixture was decolorized after 3–5 minutes and became yellowish-orange after about 15 minutes. After allowing the solution to stand for a few minutes, it is extracted with ether. 0.14 g. of quinone are obtained after evaporation of the ether. Sometimes said quinone is mixed with red crystals of the molecular compound of 1 mol of quinone and 2 mols of phenol.

*Example 2*

0.8 cc. of o-cresol are dissolved in 4 cc. of ether and a solution of 2.14 g. of the potassium salt of nitroso disulfonic acid in 110 cc. of water is gradually and in portions added thereto while shaking vigorously. The color of the mixture turns soon from violet to brown. After about 10 minutes, the mixture is extracted with ether. On evaporation of the ether, 0.12 g. of brown crystals are obtained. They are recrystallized from petroleum ether and yield yellow prisms and platelets of toluquinone having a melting point of 67° C.

*Example 3*

0.25 g. of guaiacol are dissolved in 4 cc. of ether and a solution of 1.61 g. of the potassium salt of nitroso disulfonic acid in 80 cc. of water is gradually and in portions added thereto while shaking vigorously. After about 5 minutes, the mixture is extracted with ether. On evaporation of the ether, 0.19 g. of yellow to brown crystals are obtained which, on recrystallisation from benzene and treatment of the benzenic solution with decolorizing carbon, have a melting point between 137° C. and 139° C.

*Example 4*

0.3 g. of thymol are dissolved in 5 cc. of water and 2 cc. of N sodium hydroxide. 15 cc. of a lukewarm aqueous solution of 0.54 g. of potassium nitroso disulfonate are added thereto. After disappearance of the violet color, twice the same amount of the oxidizing solution is added whereby a yellow oil precipitates. 1 cc. of 2 N acetic acid are added to neutralize the alkaline reaction, and again the same amount of the oxidizing solution is added while shaking vigorously. The reaction mixture is stirred for 20 minutes, 20 cc. of ether are added, the mixture is shaken for about 30 minutes, and the yellow ether extract is separated from the violet aqueous solution. The ether extraction is repeated twice and the combined ether extracts are washed first with 25 cc. of water containing 1 cc. of N sodium hydroxide solution and then with water alone. After drying the ethereal solution and evaporating the ether, 0.31 g. of yellow plates of thymo-quinone, having a melting point of 43–46° C., are obtained. In the same manner carvacrol yields 73% thymoquinone.

*Example 5*

0.28 g. of p-hydroxy benzoic acid are dissolved in 5 cc. of water and 2.5 cc. of N sodium hydroxide solution. A solution of 0.54 g. of potassium nitroso disulfonic acid in 15 cc. of lukewarm water is added thereto and this addition is repeated twice. The mixture is then neutralized by the addition of 1.5 cc. of 2 N acetic acid and again 0.54 g. of potassium nitroso disulfonic acid dissolved in 15 cc. of lukewarm water, are added thereto. After allowing the reaction mixture to stand for about 1 hour at 5° C. it is extracted with ether. On evaporation of the ether, 0.08 g. of p-quinone are obtained. The aqueous layer, after acidifying with N sulfuric acid, yields, on extraction with ether, acid, resinous substances.

*Example 6*

60 cc. of an aqueous solution of 2 g. of potassium nitroso disulfonate are added in portions to a solution of 0.3 g. of tyrosine in 10 cc. 1/10 N sodium hydroxide. First the reaction mixture attains the characteristic red color of the corresponding e-quinone and slowly the so-called tyrosine black precipitates.

Wool, silk, collagen, and other biological materials exhibit the same color reaction and tyrosine black formation on treatment with potassium nitroso disulfonate.

*Example 7*

1 g. of ferula acid are dissolved in 10 cc. of water and 5.5 cc. of N sodium hydroxide solution. 40 cc. of an aqueous solution of 1.35 g. of potassium nitroso disulfonate are gradually and in portions added thereto. Each portion of the oxidizing solution is added only after the originally produced brown coloration disappears. The solution soon becomes turbid and a pinkish finely crystalline precipitate is obtained. The pH of the solution remains almost unchanged and is about 8.0. The precipitated compound is filtered by suction. Yield 0.2–0.3 g., melting point around 180° C. with decomposition.

The mother liquor, on acidifying with N hydrochloric acid and extracting with ether, produced 0.3 g. of a light resin which soon solidifies. On recrystallisation from methanol, 0.2 g. of the starting material, i. e. of ferula acid, of a melting point of 164–165° C. are obtained.

The crude product (M. P. about 180° C.) is dissolved while heating, in 20 to 30 cc. of a mixture of methanol and water (3:1), the solution is decolorized by means of decolorizing agents (carbon) and is concentrated by evaporation in a vacuum until it starts to become turbid. On complete evaporation of the methanol a colorless crystalline substance is obtained which is filtered off while the solution is still hot. On repeated recrystallisation from pure methanol a compound is finally obtained in colorless prisms which melts at 216° C. with decomposition. An analysis of said compound shows that it corresponds to the general formula $C_{19}H_{18}O_6$, indicating that 2 hydrogen atoms and 1 mol of carbon dioxide were split off from two mols of ferula acid. The compound, most probably, has a quinomethide structure. Its solution in 6–12 N hydrochloric acid is violet-reddish colored, likewise its solution in concentrated sulfuric acid. When adding one drop of concentrated nitric acid to its sulfuric acid solution, the color changes to pale yellow; when pouring the same into water, it becomes colorless.

The compound is almost insoluble in water, ether, chloroform, benzene, and acetone, and slightly more soluble in alcohols. N/100 sodium hydroxide solution does not dissolve the compound. It is soluble in N sodium hydroxide solution with yellow color and again precipitates on careful acidification with N hydrochloric acid. Ketone reagents produce a precipitate. The compound is soluble in dioxane at elevated temperature. The solution has a yellow color. But no precipitate is obtained on cooling. The same phenomenon is observed on dissolving the compound in tetrahydrofurane. The yellow color of said solutions disappears on addition of water. Evaporation of the dioxane solution yields an almost colorless product.

A compound of the general formula $C_{18}H_{18}O_5$ can also be isolated and its monoxime is obtained in the form of difficulty soluble well shaped prisms and polyhedrons from its aqueous alcoholic solution by means of hydroxyl amine after standing for 1 day.

Example 8

To an aqueous solution of sodium hydroxylamine disulfonate obtained by reacting 33 g. of chemically pure sodium nitrite dissolved in 100 cc. of water with 90 cc. of an aqueous 10 N sodium hydrogen sulfite solution after adding 19 cc. acetic acid and 25 cc. of chemically pure 18% ammonia, there are added, while stirring, 380 cc. of a chemically pure N potassium permanganate solution in water. The temperature during addition of the permanganate is carefully kept between 0° C. and 5° C. After allowing the reaction mixture to stand for about ½ to 1 hour, the manganese dioxide precipitate is filtered off, and the filtrate is again poured through the same filter. The filtrate is tested for the absence of manganese.

One and a half times its volume of an aqueous potassium chloride solution, saturated at 20° C., is added thereto and the mixture is cooled by means of ice. The precipitated potassium salt of nitroso disulfonic acid is then filtered off by suction and is recrystallized by dissolving in N potassium hydroxide solution at 50° C. and cooling said solution, after filtration, to about 5° C. The precipitate is filtered off by suction and carefully washed with cold methanol which must be free of any reducing impurities. The pure crystalline salt is dried and kept in a vacuum desiccator. Yield, calculated for sodium hydrogen sulfite used: Between 65–67%. The solid salt has a yellow-orange color and is dimeric while in solution it is monomeric and the solution has a permanganate-like violet color.

In the place of compounds containing phenolic hydroxyl groups, one may subject other compounds having dehydrogenizable hydrogen to the same dehydrogenating and oxidizing treatment with metal salts of nitroso disulfonic acid, especially with the potassium salt of said acid, as described in the preceding examples. In this manner, there is obtained, for instance, azobenzene from hydrazo benzene, benzoic acid from benzhydrazide, benzoyl phenyl hydrazide from benzaldehyde phenyl hydrazone and others more. E. g. diazobenzene from phenylhydrazine, proved by coupling with β-naphthol, furthermore a red dye $C_{18}H_{15}ON_3$ prisms having the M. P. 128° from aniline, from anisidine a red crystallized red base having the M. P. 186°, from β-naphthylamine a red base isolated as perchlorate of the formula $C_{30}H_{21}O_5N_3 \cdot HClO_4 \cdot$ o-Phenylene diamine in dilute acetate solution caused immediately change in color to dark brown and produced a dark, almost black precipitate of violet shade. An ethereal diphenylamine solution attained a reddish-brown to yellow color. Sulfur containing compounds, especially compounds with sulfhydryl groups, such as cysteine, methionine, lanthionine, and, sometimes, thio ethers and disulfides, such as cystine, did also react with said oxidizing salt. Glucosazone was converted into phenyl-d-glucosotriazole. Semicarbazide hydrochloride and hydroxylamine hydrochloride reacted rapidly but only after addition of acetate. Thiourea and, under certain conditions, alkyl isothiourea compounds also caused decolorisation of the solution of said reagent. The method according to this invention provides also the new benzoquinones:

Example 9

0.4 g. of 2,4-dimethyl phenol in 4 cc. of methanol is reacted with 0.6 g. of potassium nitroso disulfonate in 30 cc. of water. Extraction with ether yields after concentration of the solution and cooling to —60° C. 0.23 g. of 3,5-dimethyl-o-benzo quinone.

The corresponding catechol having the M. P. 87 to 88° results by reduction with sulphur dioxide.

Example 10

1.2 g. p-tert. butylphenol are dissolved in 160 cc. of methanol. There are added the solution of 4.8 g. of potassium nitroso disulfonate in 420 cc. of water and 20 cc. N sodium acetate. After 30 minutes 200 cc. of the solution are distilled off in vac. By extraction with ether and crystallisation at —60° C. result 0.92 g. of crude tert.butyl-o-benzoquinone. M. P. 68° C.

Example 11

Like Example 10 there are obtained from isothymol 55% 5-isopropyl-3-methyl-o-benzoquinone.

Example 12

By dissolving α-naphthol in methanol and adding 2 molecules of potassium disulfonate in water with a few cc. of N mono potassium phosphate and standing one hour crystallises 1.4-naphthoquinone in a yield of 75%.

Example 13

In the same reaction like Example 12 β-naphthol yields 75% β-naphtho-quinone which is crystallised in red needles.

In the place of the organic compounds having a phenolic hydroxyl group which are used as starting materials in the preceding examples, there are oxidized in the same manner equimolecular amounts of the following phenolic compounds which yield the below listed oxidation products.

| Starting material | Oxidation product: |
|---|---|
| phenol | p-Quinone |
| p-hydroxybenzoic acid | p-quinone |
| o-cresol | toluquinone |
| m-cresol | toluquinone |
| p-cresol | homo-o-benzo quinone |
| guaiacol | methoxy quinone |
| 2.3-dimethylphenol-1 | 2.3-dimethyl benzo quinone-1.4 |
| 2.4-dimethylphenol-1 | 3.5-dimethyl benzo quinone-1.2 |
| 2.5-dimethylphenol-1 | 2.5-dimethyl benzo quinone-1.4 |
| 2.6-dimethylphenol-1 | 2.6-dimethyl benzo quinone-1.4 |
| 3.4-dimethylphenol-1 | 4.5-dimethyl benzo quinone-1.2 |
| 2-hydroxy-diphenyl | 2-phenyl benzo quinone-1.4 |
| pyrogallol-1.3-dimethyl ether | 2.6-dimethoxy benzo quinone-1.4 |
| phloroglycine dimethyl ether | 2.6-dimethoxy benzo quinone-1.4 |
| syringic acid | 2.6-dimethoxy benzo quinone-1.4 |
| 3-methyl-5-ethyl phenol | 3-methyl-5-ethyl benzo quinone-1.4 |
| 2.3.5-trimethyl phenol | 2.3.5-benzoquinone-1.4 |
| 4-tert.butyl phenol | 4-tert.butyl benzo quinone-1.2 |
| α-naphthol | naphthoquinone-1.4 |
| β-naphthol | naphthoquinone-1.2 |
| 8-hydroxy quinoline | quinoline quinone-5.8 |

I claim:

1. In a method of producing oxidation products of organic compounds, the step comprising oxidizing organic compounds with phenolic hydroxyl groups with metal salts of nitroso disulfonic acid.

2. In a method according to claim 1, wherein the metal salt of nitroso disulfonic acid is the potassium salt of said acid.

3. In a method according to claim 2 wherein the organic compound with phenolic hydroxyl groups is substituted in ortho-position to said phenolic hydroxyl groups.

4. In a method according to claim 2, wherein the organic compound with phenolic hydroxyl groups is substituted in para-position to said hydroxyl groups.

5. In a method of producing quinone compounds, the step comprising oxidizing organic compounds with phenolic hydroxyl groups with metal salts of nitroso disulfonic acid.

6. In a method of producing quinone compounds, the step comprising oxidizing a monovalent phenol with a metal salt of nitroso disulfonic acid.

7. In a method of producing p-quinone, the steps comprising dissolving phenol in water, adding thereto an aqueous solution of the potassium salt of nitroso disulfonic acid, and isolating the quinone from the reaction mixture.

8. In a method according to claim 7, wherein 4 mols of the potassium salt of nitroso disulfonic acid are added to each one mol of phenol.

9. In a method of producing quinone compounds, the steps comprising dissolving an organic compound with a phenolic hydroxyl group in methanol or in water and alkali hydroxide, adding thereto an aqueous solution of at least two mols of a metal salt of nitroso disulfonic acid for each phenolic hydroxyl group, maintaining the reaction of the mixture between slightly acid and slightly alkaline by the addition of buffer solutions, and isolating the quinone compound from the reaction mixture.

References Cited in the file of this patent
UNITED STATES PATENTS

| | | |
|---|---|---|
| 2,458,404 | Nagle | Jan. 9, 1949 |
| 2,547,913 | Lagally | Apr. 3, 1951 |
| 2,564,967 | Fieser | Aug. 21, 1951 |

OTHER REFERENCES

J. Am. Chem. Soc., vol. 56, 2487–89 (1934).

Beilstein (1925), vol. 7, p. 609.

Meller: Inorg. and Theoretical Chem., Longmans and Green (1947), pp. 673–5.

Raschig, Schwefel and Stichstoffstudien, Verlag Chemie (1924), p. 152.

J. Am. Chem. Soc. 56, 2478–81 (1934).

J. Chem. Soc. 1931, 1842–57.